United States Patent [19]
Nguyen et al.

[11] Patent Number: 5,455,757
[45] Date of Patent: Oct. 3, 1995

[54] POWER CONVERTER HAVING REGENERATION CIRCUIT FOR REDUCING OSCILLATIONS

[75] Inventors: Hai N. Nguyen; James S. Dinh, both of Spring, Tex.

[73] Assignee: Compaq Computer Corp., Houston, Tex.

[21] Appl. No.: 188,484

[22] Filed: Jan. 28, 1994

[51] Int. Cl.$^6$ ........................................... H02M 3/335
[52] U.S. Cl. ........................... 363/21; 363/97; 363/20
[58] Field of Search ................................. 363/16, 18, 19, 363/20, 21, 56, 74, 78, 97, 131

[56] References Cited

U.S. PATENT DOCUMENTS

| | | | |
|---|---|---|---|
| 4,616,300 | 10/1986 | Santelmann, Jr. | 363/21 |
| 4,709,316 | 11/1987 | Ngo et al. | 363/21 |
| 4,809,148 | 2/1989 | Barn | 363/20 |
| 4,959,764 | 9/1990 | Bassett | 363/16 |
| 4,975,823 | 12/1990 | Rilly et al. | 363/97 |
| 5,099,406 | 3/1992 | Harada et al. | 363/20 |
| 5,111,372 | 5/1992 | Kameyama et al. | 363/20 |
| 5,189,599 | 2/1993 | Messman | 363/21 |
| 5,276,604 | 1/1994 | Messman | 363/97 |
| 5,282,123 | 1/1994 | Boylan et al. | 363/21 |
| 5,297,014 | 3/1994 | Saito et al. | 363/21 |

*Primary Examiner*—Peter S. Wong
*Assistant Examiner*—Matthew V. Nguyen
*Attorney, Agent, or Firm*—Pravel, Hewitt, Kimball & Krieger

[57] ABSTRACT

A power converter including a complementary regeneration circuit for eliminating oscillations and conserving leakage energy to increase the efficiency of a flyback power converter. The complementary regeneration circuit includes a regeneration capacitor, a regeneration switch, a diode and appropriate timing circuitry to switch the regeneration capacitor in and out of the circuit at the appropriate times. Due to the operation of the regeneration switch, the capacitance of the regeneration capacitor is much larger than a typical snubber/clamp capacitor, so that it overdamps the circuit eliminating voltage overshoot typically appearing across the primary switch. The regeneration capacitor charges with regeneration energy and drives negative current into the primary inductor, holding the voltage across the primary switch constant when the secondary current goes to zero. When the regeneration switch is turned off, the negative current in the primary inductor drains the capacitance in the primary switch, which activates the inherent diode of the primary switch causing low voltage across the primary switch when it is turned on. A simple resistor or transistor circuit may be added between the input voltage and the PWM timing circuit to change the frequency of operation to compensate the regeneration energy for changes in the input voltage. Similarly, a resistive element coupled between the PWM timing circuit and an auxiliary voltage having a voltage proportional to the output voltage changes the operating frequency to compensate the regeneration energy for changes in the output voltage.

18 Claims, 4 Drawing Sheets

POWER CONVERTER HAVING REGENERATION CIRCUIT FOR REDUCING OSCILLATIONS

BACKGROUND OF THE INVENTION

1. Field of the Invention

The present invention relates to a power converter including a complementary regeneration circuit for eliminating oscillations and conserving leakage energy to increase efficiency and save energy.

2. Description of the Related Art

Computers and computer systems are becoming smaller and more sophisticated and yet are operating at higher frequencies. Notebook computers, for example, typically include an i486 microprocessor by the Intel Corp. (Intel), which may operate at frequencies of up to 100 MHz. The size of the notebook computer, however, has about the same dimensions as a stack of notebook paper being between 1 to 2 inches thick. Power may be provided from an AC source, such as a typical wall outlet, or by batteries. The present invention primarily concerns the AC adapter, where AC voltage and current from an AC source is converted to regulated DC power appropriate for use by the computer system.

In general, it is desired to convert the same amount of power to operate the computer as a conventional AC/DC converter, except using a smaller and lighter power supply while also decreasing heat generation. In practical terms, the same level of power conversion is desired at the same ambient temperature without the use of fans within the power supply and without negatively impacting the internal or external thermal environment. Therefore, the power supply must be physically smaller and yet achieve a higher efficiency, thereby requiring a higher power density. A higher efficiency is necessary to maintain the temperature requirements without an increase in size.

It is further desired to eliminate the bulky AC adapter typically provided with a portable or notebook computer. The AC adapter is usually a separate unit, causing inconvenience in use and travel. Thus, it is desired to place the AC adapter inside the housing of the computer itself. Although ambient temperature requirements to prevent harm to human operators are essentially eliminated, the temperature must still be controlled to prevent an undesirable rise in temperature within the housing, which could affect the operation of the computer. Also, the AC adapter should be as lightweight as possible to reduce the overall weight of the computer system. Further, it is desirable that the system operate without excessive noise or electromagnetic interference (EMI) problems.

In summary, it is desired to have the best of all worlds, that is, a low cost, high efficiency, smaller power supply for converting the same or even increased amount of power yet operating without substantial EMI.

To achieve some of these goals, designers have typically favored flyback converters. Flyback converters are simpler and easier to design than other types of converters, including forward converters. The simplicity of the flyback topology allows fewer parts and lower cost, which is ideal for use in smaller computer systems. Other converter methods typically require extra inductances, thereby increasing the size and cost of the AC adapter. For example, forward converters are more efficient on the average, but are generally more complicated. Thus, flyback converters are preferred for use in the smaller, higher powered computer systems.

Flyback converters transfer energy from a primary to a secondary circuit rather than transforming voltage and current. This intrinsic characteristic of flyback converters allows a natural constant power operation, which provides the advantage of reducing size and decreasing the maximum power rating to achieve the same amount of power conversion. The advantages of constant power operation are described in U.S. patent application Ser. No. 07/701,657, filed May 16, 1991, which is hereby incorporated by reference.

In spite of the advantages of flyback converters, they also have several disadvantages. Flyback converters tend to be less efficient than other types of converters and emit proportionately higher amounts of electromagnetic energy. Flyback converters have an average efficiency rating of approximately 70%, although well-designed units may achieve efficiencies of 80–82%. These efficiencies do not compare well to the 85% or above range typically achieved using forward converters. Other known design techniques may be used to increase the efficiency of a flyback converter to slightly above 85%, but these techniques almost invariably add cost and increase size.

The reason for the low efficiency rating of flyback converters is the method of power conversion combined with parasitic reactances. The primary switch is usually a metal-oxide-semiconductor field effect transistor (MOSFET), which includes an undesirable, yet inherent drain to source capacitance. In a flyback converter, energy conversion occurs in two phases for each power cycle, as controlled by a standard pulse-width modulation (PWM) circuit. A bridge and filter circuit converts AC voltage from an AC source to a relatively high, unregulated DC voltage. During a first primary conduction phase, the primary switch is activated allowing a linearly ramping current to flow from the primary DC source through the primary inductance of the transformer. The secondary circuit includes a rectifier diode connected so as not to allow current flow in the secondary inductor during the primary conduction phase. Thus, energy is stored in the transformer during the primary conduction phase.

The PWM circuit monitors certain conditions either in the primary or secondary circuit to determine when to end the primary conduction phase. When these conditions are met, the PWM circuit turns off the primary switch initiating a flyback phase, where the energy stored in the transformer is transferred to the secondary circuit and eventually to the load. Usually, sometime after the end of each flyback phase, a new power cycle is initiated by turning on the primary switch. At this point, the high voltage input source is still present across the primary switch. Thus, the primary switch is activated in a high voltage condition, causing power and efficiency loss as the energy stored in its output capacitance is discharged.

In an ideal transformer, all of the energy from the flow of the primary current is stored in the transformer, and then all the stored energy is transferred to the secondary so that the primary current flow falls to zero instantaneously. However, physical transformers include parasitic, uncoupled ("leakage") inductance in the primary inductor. During the transition switching time, the current through the primary and leakage inductors continues to flow, thereby charging the switch capacitor. Then, the excess energy oscillates naturally between the leakage inductor and the switch capacitor causing unwanted damped oscillations in the primary circuit. When the secondary current falls to zero during the flyback phase, the primary switch capacitor discharges through the primary and leakage inductors causing more unwanted oscillations. Further, the forced switching and coupled inductances cause current spikes in the primary and secondary circuits. These oscillations and current spikes cause most of the noise, regulation and efficiency problems experienced with flyback converters.

The damped oscillations cause several problems. First, during the initiation of the flyback phase, the leakage inductance causes the voltage overshoot across the primary switching device producing excess stress, energy loss and radio frequency noise. The excessive voltage overshoot requires the use of a switching device with twice the voltage rating than theoretically necessary and also the use of EMI filtering devices many times larger than otherwise possible. The MOSFET switching device typically includes a drain to source resistance, referred to as $RDS_{ON}$, which is proportional to its voltage rating. Thus, the higher voltage rating leads to a corresponding energy loss in the $RDS_{ON}$ resistance, requiring larger heat sinks.

The oscillations are also absorbed through stray resistance, causing undesirable heat and leading to a significant loss of efficiency. Any noise or oscillations generated in the primary circuit causes electromagnetic interference (EMI), which could couple into the AC source. This could violate federal radiation emission requirements, or otherwise force a lower EMI rating, and also cause interference with other electrical devices located nearby.

The oscillations generated in the primary circuit are transferred to the output circuit, typically through auxiliary inductances used as a power source for support and control circuitry. This may not pose a real problem during full load conditions since the oscillations are mostly absorbed by the load. However, the excess energy of the damped oscillations transferred to the output tends to cause severe regulation problems during low or no-load conditions. Under low or no-load conditions, excess energy is stored in the load capacitor, causing its voltage to rise. Although only a very small amount of energy is stored during each cycle, the cumulative energy in high frequency operations, typically ranging between 60 to 200 KHz, is substantial over time. The voltage across the load capacitor eventually rises above the allowed maximum voltage level, possibly causing a hazardous condition and damage to circuit components.

Several solutions have traditionally been tried to solve the inherent problems with flyback converters. Although each of these problems may be solved in one way or another, the simultaneous solution to all problems has only been achieved at a significant cost or increase in size of the converter. To solve the noise and EMI problems, filter circuits have been used, which add cost and increase the size due to filter inductances. Voltage overshoot problems may also be solved through filter circuits, damping circuits or snubber circuits, but these circuits typically absorb energy, causing heat. The capacitance of traditional snubber capacitors must be limited since increasing the snubber capacitance reduces the efficiency. The excess energy at the output may be solved through a bleed resistor or other small load, but this again causes heat and a loss of efficiency. Of course, other buck-based topologies or forward topologies have been tried, resulting in a loss of the intrinsic advantages of the flyback topology, such as the constant power benefits.

Therefore, it is desirable to retain the advantages of a flyback converter, such as low cost and simplicity, while reducing or otherwise eliminating the undesirable characteristics, such as oscillations and low efficiency. It is desired to reduce or eliminate these problems without substantially increasing cost or component count to achieve a lightweight, highly efficient AC adapter, that will, ideally, be even smaller than present convention.

SUMMARY OF THE PRESENT INVENTION

In a power converter according to the present invention, a complementary regeneration circuit is coupled between the PWM circuit and the primary switch of a flyback converter to reduce or otherwise eliminate damped oscillations. The complementary regeneration circuit includes timing circuitry to coordinate operation of an auxiliary switch with the primary switch to achieve very low voltage turn on of both switches. The regeneration circuit also conserves leakage energy by recycling the excess energy to overdamp the circuit, thereby eliminating voltage overshoots and current spikes causing noise.

The complementary regeneration circuit includes a capacitor, a switch, a rectifier and simple timing circuitry to coordinate the regeneration switch. The regeneration capacitor is switched by the regeneration switching device, allowing the regeneration capacitor to have an extremely large capacitance as compared to a typical snubber capacitor. The large capacitance allows overdamping of the circuit including the primary and leakage inductors, virtually eliminating voltage overshoot.

The timing circuitry is very simple and typically includes inexpensive resistors, capacitors and diodes. Furthermore, the timing circuitry is included only in the primary circuit and does not require special isolation circuitry between the primary and the secondary circuits. The regeneration switch is preferably controlled by the same PWM circuit already present in the flyback converter, and is slaved to the primary switch using the timing circuitry.

In operation, the PWM asserts its output to initiate the primary conduction phase for energy storage. As described below, the regeneration switch, being on from the previous cycle, is turned off, while the primary switch is delayed before being turned on by the timing circuitry. After the delay, the primary switch is turned on, allowing current flow through the primary inductor. The PWM eventually negates its output to initiate the flyback phase. The timing circuitry allows the primary switch to turn off quickly, but provides another delay before turning on the regeneration switch. Meanwhile, the residual current flowing through the primary and leakage inductors is shared between the regeneration capacitor and the drain to source capacitance of the primary switch. The action of the regeneration capacitor, having a very large capacitance, overdamps the voltage rise appearing on the drain of the primary switch, thereby virtually eliminating the voltage overshoot. Further, the large capacitance lowers the frequency of this oscillation to the point that its effects are virtually eliminated.

The current flowing from the regeneration capacitor turns on the rectifier in parallel with the regeneration switch, thereby clamping a very low voltage across the regeneration switch. After the delay, the regeneration switch is turned on, thereby providing very low voltage turn on for the regeneration switch. The delay is preferably long enough to allow the primary switch to turn fully off. Eventually, the secondary current drops to zero and the output rectifier turns off, thus ending the flyback phase. The regeneration capacitor, being charged with a high voltage, begins to drive negative current into the primary inductor, thereby holding the primary inductor voltages constant and eliminating typical oscillations between the primary and leakage inductors with the drain to source capacitor of the primary switch. Also, the turn off transition of the output rectifier is significantly softened, effectively eliminating voltage spikes in the primary and secondary circuits. The period between the termination of the flyback phase and the end of the cycle is referred to as the regeneration phase, where the negative primary current establishes a regeneration energy in the primary inductor.

At the end of the regeneration phase, the PWM circuit asserts its output high to initiate the next power cycle. The timing circuit allows the regeneration switch to turn off immediately, and the negative primary inductor current provided from the regeneration capacitor is switched so that it is provided solely by the drain to source capacitor of the primary switch. The intrinsic primary switch capacitor discharges quickly and turns on the drain to source diode of the primary switch. In a sense, the regeneration energy is supplied by the primary switch at the beginning of the cycle. After the delay, the primary switch is turned on while its intrinsic diode is conducting, providing very low, virtually zero turn on voltage for the primary switch.

A flyback converter including a complementary regeneration circuit according to the present invention as described above allows a substantial improvement in efficiency over prior flyback converters at given input and output voltages. Any changes in the input or output voltages, however, may affect the regeneration period and thus the regeneration energy, which could cause a reduction of the efficiency improvement. For example, a drop in the output voltage causes the flyback phase to be extended, thereby reducing the regeneration period and energy assuming fixed frequency of operation. One way to increase the regeneration energy in response to a lower output voltage is to increase the regeneration period, which may be achieved by decreasing the operating frequency. Since the PWM circuit is typically powered through an auxiliary winding on the transformer, the VCC input signal to the PWM typically varies proportionately with the output voltage. Also, a simple resistor-capacitor (RC) timing circuit coupled to an oscillator input of the PWM defines the operating frequency. In the preferred embodiment, efficiency of operation is improved by providing a resistor between the VCC and oscillator inputs of the PWM so that the frequency of operation is varied proportionately with the output voltage.

It may also be desirable to operate the flyback converter for several input voltage levels. In fact, the DC unregulated input voltage may vary by a factor of about four between domestic and international AC line voltage levels. An increase of the input voltage decreases the duty cycle of the flyback converter, thereby increasing the regeneration period and energy. This is generally desired since a greater input voltage requires a larger regeneration energy for maximum efficiency. However, the regeneration energy may not change by the desired amount. If the duty cycle is very small for lower input voltages, a substantial increase of input voltage has relatively little impact on the regeneration period and energy. In the low duty cycle case, therefore, it is desired to increase the regeneration period and energy to compensate for the large input voltage increase. In the preferred embodiment, a simple inverting transistor circuit coupled between the input voltage and oscillator input of the PWM varies the operating frequency inversely with changes of input voltage. This provides the appropriate compensation of the regeneration energy for changes of the input voltage for operation at small duty cycles.

On the other hand, if the duty cycle is initially very large with a low input voltage, a substantial increase of the input voltage disproportionately increases the regeneration period and energy. Thus, it is desired to increase the operating frequency to compensate the regeneration energy with increases of the input voltage. A simple resistor provided between the input voltage and the oscillator input of the PWM may be used to provide the desired compensation. It is noted that there is an ideal duty cycle at which the flyback converter would not require any compensation. However, the duty cycle is typically defined by other important parameters and design considerations, so that operation at the ideal duty cycle may not be a readily available option. The regeneration energy compensation circuits, however, are very simple to implement.

In summary, the complementary regeneration switch of the present invention solves most of the major problems typically characteristic of flyback converters. Oscillations and current spikes are eliminated substantially increasing the efficiency of the converter. The circuitry to implement the complementary regeneration circuit is very simple and inexpensive, so that the cost and size of the flyback converter are not significantly increased.

BRIEF DESCRIPTION OF THE DRAWING

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
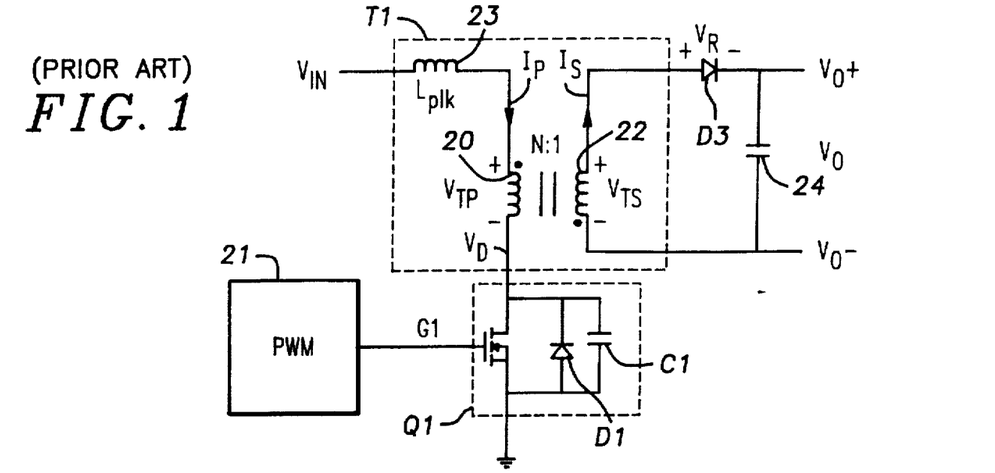
FIG. 1 is a simplified schematic diagram of a flyback converter according to prior art.

Referring now to FIG. 1, a simplified schematic diagram is shown of a typical flyback converter according to prior art. A relatively large, unregulated DC voltage, referred to as $V_{IN}$, is provided to the dotted terminal of a primary inductor 20 of a transformer T1. The $V_{IN}$ signal is provided from an AC source, bridge rectifier and filter circuit, where these components are not shown in FIG. 1 for purposes of simplicity. The voltage $V_{IN}$ is typically about 100–400 volts for a system operating with standard AC voltages in the world.

The undotted terminal of the primary inductor 20 is connected to the drain terminal of an n-channel metal-oxide-semiconductor field-effect-transistor (MOSFET) Q1, which has its source terminal coupled to ground. The gate terminal of the MOSFET Q1 is connected to a pulse-width modulation (PWM) circuit 21 providing a signal G1 for controlling the operation of the MOSFET Q1. A leakage inductor 23, having an inductance referred to as $L_{PLK}$, represents the primary leakage inductance of the primary inductor 20 of the transformer T1. For convenience, the leakage inductor 23 is shown coupled in series with the primary inductor 20 for schematic representation.

The undotted terminal of a secondary inductor 22 of the transformer T1 is connected to the anode of an output rectifier or diode D3, having its cathode providing a signal $V_O^+$ to one side of an output capacitor 24. The dotted terminal of the secondary inductor 22 provides a signal $V_O^-$, which is provided to the other side of the capacitor 24. The voltage between the $V_O^+$ and $V_O^-$ signals is generally referred to as the output voltage $V_O$. The voltage across the primary inductor 20 will be referred to as $V_{TP}$ and the voltage across the secondary inductor 22 will be referred to as $V_{TS}$. The voltage across the diode D3 from its anode to cathode will be referred to as $V_R$. The voltage of the undotted terminal of the primary inductor 20 is referred to as $V_D$. The current flowing into the dotted terminal of the primary inductor 20 will be referred to as $I_P$ and the current flowing out of the undotted terminal of the secondary inductor 22 will be referred to as $I_S$.

The MOSFET Q1 has an inherent or internal diode D1 having its anode connected to the source and its cathode connected to the drain of the MOSFET Q1. Likewise, an inherent drain to source capacitor, referred to as C1, is connected between the drain and source of the MOSFET Q1. As will be described below, the capacitor C1 is undesirable since it oscillates with the primary and leakage inductors 20, 23, causing unwanted voltage overshoots and oscillations.

Figure 2:
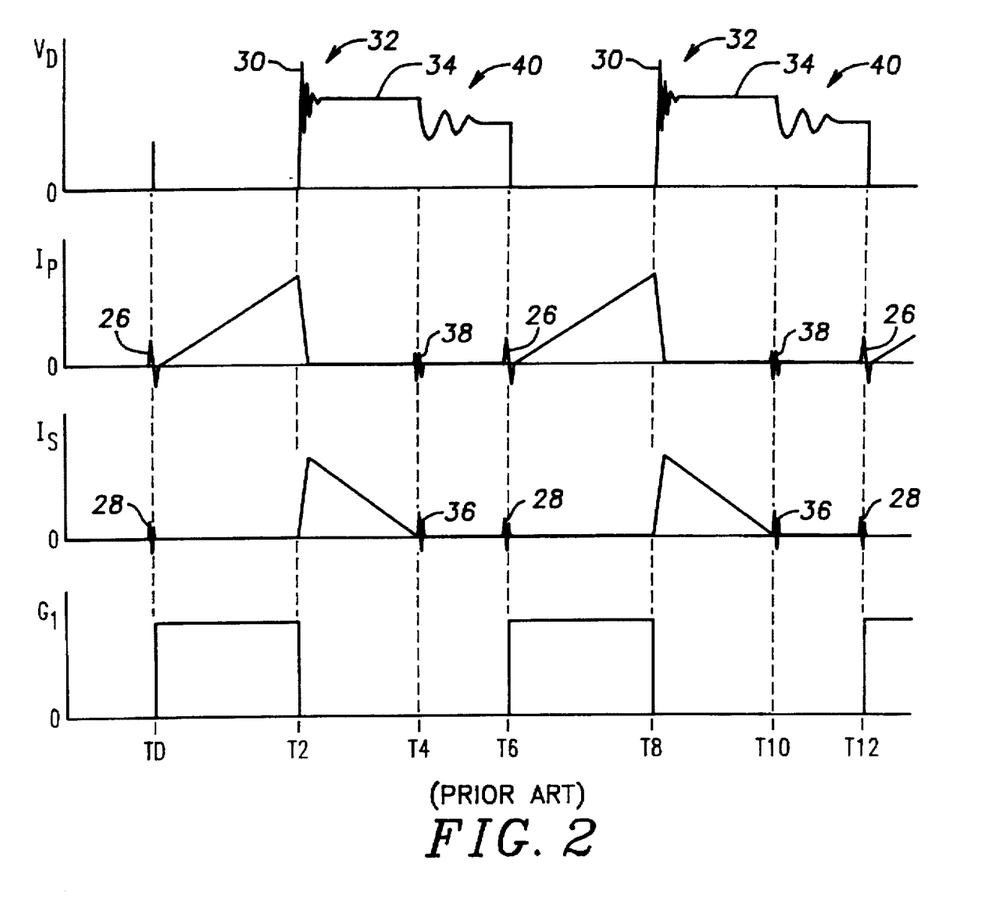
FIG. 2 shows several timing diagrams illustrating the operation of the flyback converter of FIG. 1.

Referring now to FIG. 2, several timing diagrams are shown illustrating the operation of the flyback converter shown in FIG. 1. The timing diagrams show the $V_D$ signal, the primary current $I_P$, the secondary current $I_S$ and the G1 signal provided to the gate of the MOSFET Q1 from the PWM 21. At a time T0, the PWM 21 asserts the G1 signal high, thereby activating or turning on the MOSFET Q1. This initiates the primary conduction phase where energy is stored in the transformer T1 due to flow of the primary current $I_P$. Prior to time T0 when the MOSFET Q1 is turned off, a high impedance exists between the drain and source of the MOSFET Q1, allowing little or no current flow through the primary inductor 20. Thus, when the MOSFET Q1 is turned on, a low impedance is provided between the drain and source of the MOSFET Q1, which allows current to flow through the primary inductor 20, as illustrated by the timing diagram of the primary current $I_P$. The primary current $I_P$ preferably rises at a linear rate according to the following equation 1:

$$\frac{d(I_P)}{dt} = \frac{V_{IN}}{L_P + L_{PLK}}$$

where "d" represents delta or the rate of change of a variable, "t" represents time and $L_P$ represents the inductance of the primary inductor 20. The $V_{IN}$ signal is relatively constant.

At time T0 when the MOSFET Q1 is turned on, a current spike 26 occurs on the primary current $I_P$. Correspondingly, a current spike 28 occurs in the secondary circuit through the secondary inductor 22 due to coupled inductance of the transformer T1. The current spike 26 adds noise which could be conducted or otherwise coupled to the input AC source causing electromagnetic interference (EMI). Also, such noise represents power loss tending to decrease the overall efficiency of power conversion. The current spike 28 occurring on the secondary current $I_S$ causes excess energy which could accumulate across the output capacitor 24 under no-load conditions. This causes the output voltage $V_O$ to rise out of regulation, unless filter circuitry or a small load is placed at the output.

At a time T2, the PWM 21 negates the G1 signal low, thereby turning off the MOSFET Q1. This initiates the flyback phase where the energy stored in the transformer T1 is transferred to the secondary circuit. The primary current $I_P$ is generally interrupted, but a residual current continues to flow for a small finite amount of time. In the scale shown, the primary current $I_P$ would appear to drop instantaneously. However, the scale of the $I_P$ timing diagram at time T2 is enhanced to illustrate that a small amount of primary current $I_P$ continues to flow after time T2. During this small finite amount of time, the capacitor C1 within the MOSFET Q1 charges very rapidly until the voltage $V_{TP}$ across the primary inductor 20 becomes approximately equal to $-N(V_O+V_R)$, where N is the turns ratio of the transformer T1. Then, the voltage $V_{TS}$ becomes positive, thereby forward biasing the diode D3, turning it on.

When the diode D3 is turned on, the secondary current $I_S$ flows through the secondary inductor 22 and the diode D3. At the time T2, therefore, the energy stored in the transformer T1 due to the flow of primary current $I_P$ is transferred to the secondary circuit in the form of the secondary current $I_S$. The secondary current $I_S$ increases rapidly at time T2, although this period is enhanced to correspond with the primary current $I_P$, for purposes of illustration. The secondary current $I_S$ reaches a maximum value and then decreases linearly. The secondary current $I_S$ eventually reaches 0 at approximately a time T4.

When the MOSFET Q1 is turned off at time T2, the current $I_P$ continues to flow through the leakage inductor 23. This leakage current oscillates between the capacitor C1 and the leakage inductor 23, thereby causing a voltage overshoot 30 of the voltage $V_D$, reaching a voltage level at its peak approximately equal to $N(V_O+V_R)+V_{IN}+V_{OS}$, where $V_{OS}$ is defined by the following equation 2:

$$V_{OS} = \sqrt{\frac{L_{PLK}}{C_1}} \, I_P$$

It is appreciated that the voltage peak 30 is excessive since it is well above the voltage of the $V_{IN}$ signal. Since the turns ratio N is typically equal to about 5, the output voltage is typically about 20 volts, $L_{PLK}$ is typically about 9 microhenries (µH), $C_1$ is about 150 picofarads (pF) and $I_P$ is approximately 2A, the voltage overshoot 30 has a peak at about 600–900 volts. This voltage overshoot 30 causes substantial stress on the MOSFET Q1, so that a relatively high voltage rating is required for the MOSFET Q1. This increases the price and reduces the efficiency of the flyback converter. In particular, the drain to source impedance of the MOSFET Q1 when turned on, referred to as $RDS_{ON}$, varies with the voltage rating. The higher the voltage rating, the greater the $RDS_{ON}$, causing greater voltage drop and heat loss due to the large primary current $I_P$ flowing through the MOSFET Q1.

The voltage overshoot 30 appearing on the voltage $V_D$ is the initial stage of a damped sinusoidal oscillation 32. The oscillation 32 is eventually damped by parasitic resistances, so that the voltage $V_D$ eventually settles to a constant value at 34. The oscillation 32 is referred to as leakage energy having a frequency f, defined by the following equation 3:

$$f = \frac{1}{2\pi \sqrt{L_{PLK} C1}}$$

The oscillation 32 causes leakage energy to be lost in the form of heat generated in parasitic resistances throughout the primary circuit. Further, as with any oscillations, the oscillation 32 increases EMI radiation.

The voltage $V_D$ is held constant at $N(V_O+V_R)+V_{IN}$ as shown at 34 until time T4, when the secondary current $I_S$ goes to zero and the diode D3 is turned off. At time T4, the current $I_S$ wants to keep going negative so that some current reverses through the diode D3, thereby causing a current spike 36. The current spike 36 is inductively coupled to the primary inductor 20 as a current spike 38, as shown on the diagram for the primary current $I_P$. Furthermore, when the diode D3 turns off, an oscillation 40 occurs since the capacitor C1 discharges back through the primary inductor 20 and the leakage inductor 23. The oscillation 40 has a frequency f defined by the following equation 4:

$$f = \frac{1}{2\pi \sqrt{(L_P + L_{PLK})C1}}$$

Again, the oscillation 40 is undesirable for the same reasons described above for the oscillations 32.

At the end of the entire power cycle at a time T6, the PWM 21 again asserts the G1 signal high, thereby pulling the voltage $V_D$ to zero and initiating the primary conduction phase as described previously. The entire power cycle repeats between times T6 and T12, although the duration of the signals vary depending upon the load and other output conditions. At the beginning of each of the power cycles at times T0, T6, T12 and so on, the MOSFET Q1 is switched on while the voltage $V_D$ is at a large positive voltage level. In particular, the voltage $V_D$ may be as high as 300–400 volts or more when the MOSFET Q2 is switched on, which causes significant power loss through the $RDS_{ON}$ of the MOSFET Q1.

The current spikes 26 and 38 as well as the oscillations 32 and 40 cause many problems for computer designers. First, they lead to EMI radiation which is transferred to external power lines causing noise problems. Furthermore, the substantial oscillations 32 and 40 are eventually absorbed through parasitic resistances causing heat and a decrease in efficiency of the flyback converter. The current spikes 28 and 36 cause finite energy buildup stored in the capacitor 24 during no-load operation. This stored excess energy causes the output voltage $V_O$ to rise out of regulation. Therefore, some load must be added to the output or various other methods must be employed to absorb the excess energy.

Typically, an auxiliary winding is provided to provide power to the PWM 21, so that the oscillations 32, 40 are coupled to the output through the auxiliary winding. In a variable frequency converter, a very light load results in very high frequencies. Traditional solutions to reduce high frequency oscillations cause power dissipation, or operation in a burst mode. All of these traditional solutions do not allow an ideal mode of operation.

It is noted that the flyback converter shown in FIG. 1 is preferably operating a constant frequency, where the PWM 21 asserts the G1 signal thereby turning on the MOSFET Q1 at the beginning of each fixed time period. The time during each period when the PWM 21 asserts G1 signal low, initiating the flyback phase, is varied depending upon the mode of operation of the flyback converter. For example, a feedback circuit (not shown) detecting the output voltage or output current could define the appropriate switching conditions, so that control of the output voltage or current is achieved. In the preferred embodiment of the present invention, however, the flyback converter is constant power limited where the MOSFET Q1 is turned off when the primary current $I_P$ reaches a predetermined maximum value. This provides a substantially constant output power where the output voltage varies inversely with the output current during constant power operation. A maximum output voltage or current operation may also be implemented where the output power is reduced below the maximum level to maintain the maximum voltage or current. The present invention may be applied to any of these modes and is not limited to constant power or constant frequency operation.

Figure 3:
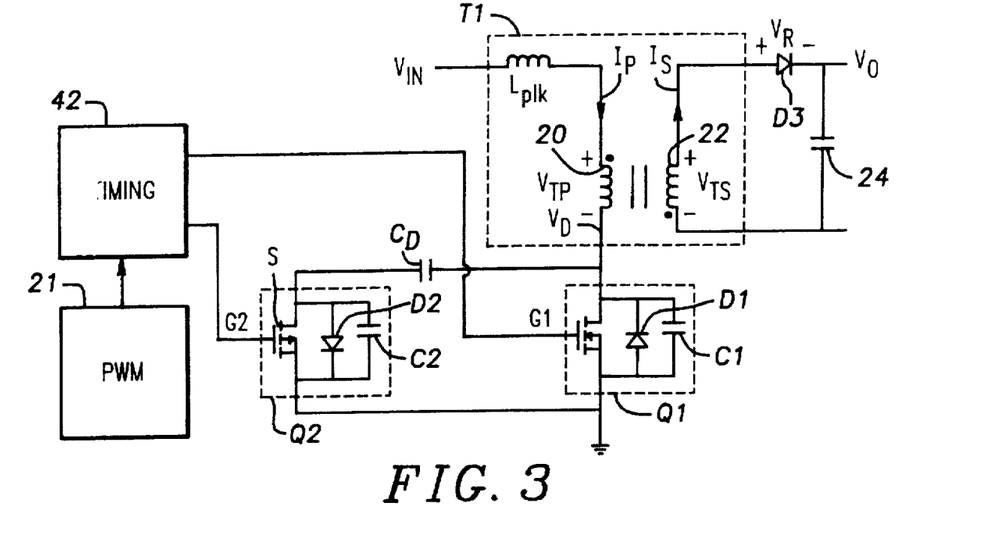
FIG. 3 is a simplified schematic diagram of a flyback converter using a complementary regeneration circuit according to the present invention.

Referring now to FIG. 3, a simplified schematic diagram is shown of a flyback converter using a complementary regeneration circuit according to the present invention. The flyback converter in FIG. 3 is very similar to the flyback circuit shown in FIG. 1 including similar components having the same reference designators, with the addition of a regeneration capacitor $C_D$, a P-channel MOSFET Q2 and a timing circuit 42. The regeneration capacitor $C_D$ has one end coupled to the drain of the MOSFET Q1 and its other end coupled to the drain of the MOSFET Q2. The source of the MOSFET Q2 is connected to ground and its gate receives a signal G2. The G1 and G2 signals are provided by the timing circuit 42, which receives the output signal from the PWM 21. The MOSFET Q2 includes an inherent diode D2 having an anode connected to the drain and a cathode connected to the source of the MOSFET Q2. Also, an inherent capacitor C2 is coupled between the drain and source of the MOSFET Q2. In general, the MOSFET Q2 operates in a similar manner as the MOSFET Q1, except that the voltage G2 must be a negative value since it is a p-channel MOSFET.

The MOSFET Q2 implements a regeneration switch comprising a switch S in parallel with a diode D2 for clamping voltage swings of the voltage $V_D$. The MOSFET Q2 is the preferred device to implement the regeneration switch since it is relatively inexpensive and capable of operating under the high voltages existing in power switching converters. Also, MOSFETs conveniently include an inherent diode, such as the diode D2. In particular, the diode D2 clamps the voltage $V_D$ and allows low voltage turn on of the MOSFET Q2. The capacitor C2, however, is not necessary or even desired, but is inherent in the MOSFET Q2. The capacitor C2 causes longer delays during switching, but the extra delay is not appreciable. Also, the diode D2 reduces some of the negative effects caused by the capacitor C2. Thus, the MOSFET Q2 is sufficient for performing the functions of the regeneration switch.

Figure 4:
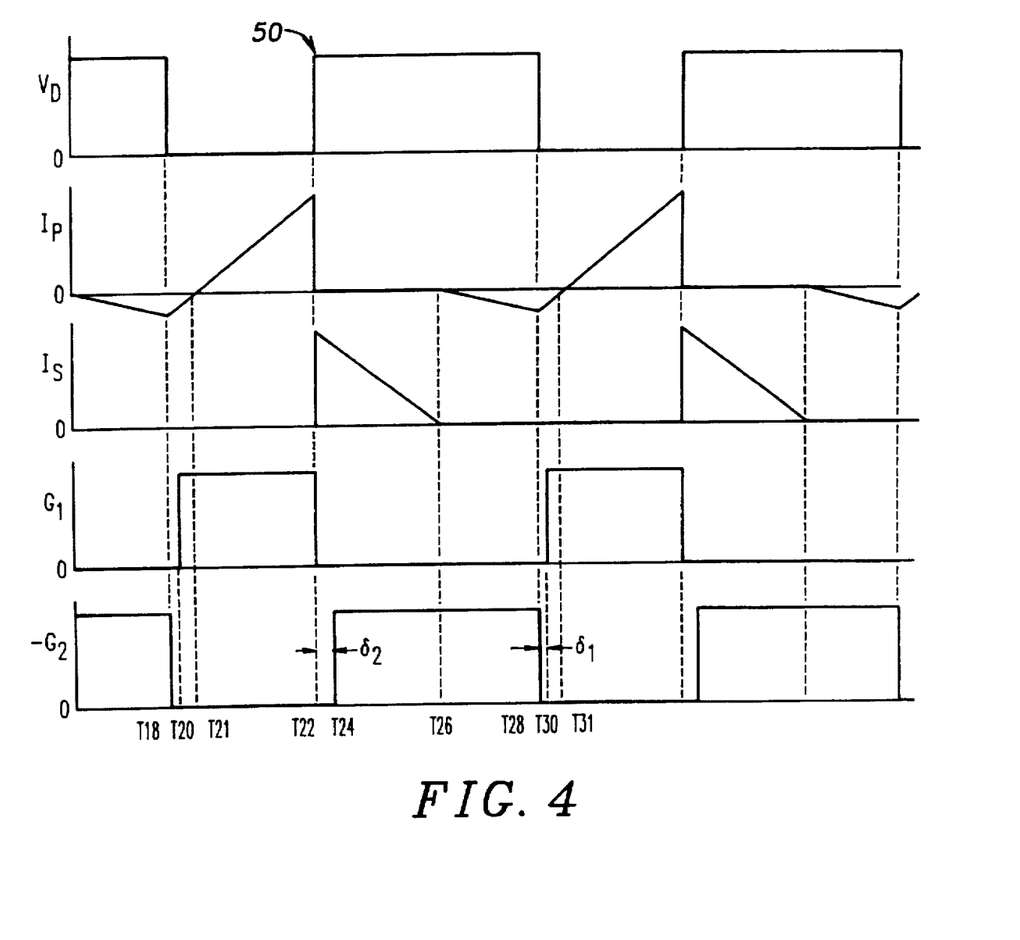
FIG. 4 shows several timing diagrams illustrating the operation of the flyback converter of FIG. 3.

Referring now to FIG. 4, several timing diagrams are shown illustrating the operation of the flyback converter according to the present invention shown in FIG. 3. The signals depicted in the timing diagrams of FIG. 4 correspond to those of FIG. 2, with the addition of a timing diagram representing the G2 signal. Since the G2 signal goes negative to turn on the MOSFET Q2, the –G2 signal is shown instead for simplicity. Thus, when the –G2 signal is negated low or zero, the MOSFET Q2 is turned off, and when the

11

–G2 signal is asserted "high", the MOSFET Q2 is turned on. The cycle essentially begins at a time T18, analogous to time T0, when the PWM 21 asserts its output high to initiate the primary conduction phase of the power cycle. Because of the improved operation as will be described more fully below, the primary current $I_P$ is actually ramping negative at time T18 due to operation of the MOSFET Q2 and the capacitor $C_D$. The timing circuit 42 immediately negates the –G2 signal, thereby turning off the MOSFET Q2, so that the primary current $I_P$ begins ramping positive from charge being provided by the capacitor $C_D$. This is described more fully below.

The timing circuit 42 does not assert the G1 signal immediately, but asserts the G1 signal after a first delay defined as δ1. Nonetheless, the G1 signal is asserted before the primary current $I_P$ reaches the zero crossover point at a time T21, which is when the primary current $I_P$ goes positive. Upon the assertion of the G1 signal, the primary current $I_P$ linearly ramps up until the G1 signal is pulled low at a time T22, in a similar manner as described previously for the flyback converter of FIG. 1. Again, the primary current $I_P$ ramps up according to equation 1. At time T22, the PWM 21 asserts its output low to initiate the flyback phase. The timing circuit immediately negates the G1 signal low, turning the MOSFET Q1 off.

At time T22, energy stored in the transformer T1 is transferred to the secondary as indicated by the secondary current $I_S$. Although not shown in FIG. 4, the primary current $I_P$ continues to flow for a small finite amount of time before reaching zero. However, the primary current $I_P$ flows into and charges both capacitors C1 and $C_D$. The current flowing into the capacitor $C_D$ also turns on the diode D2, preventing the capacitor C2 from charging beyond about 0.6 volts. The capacitor $C_D$ has a very large capacitance compared to C1, so that the voltage rise is not appreciable at the voltage $V_D$. In particular, the capacitance of the capacitor C1 is typically 200 to 300 picofarads (pF), whereas the capacitance of the capacitor $C_D$ is preferably about 1 microfarad (μF), so that the capacitance of the capacitor $C_D$ is several thousand times greater than the capacitance of the capacitor C1. Although a slight oscillation 50 does occur at the rising edge of the voltage $V_D$, its frequency is so low due to the overdamping of the capacitor $C_D$, the oscillation 50 is negligible. In particular, the frequency of oscillation 50 is defined by equation 5:

$$f = \frac{1}{2\pi \sqrt{L_{PLK}(C_D \| C_1)}}$$

where the symbol "||" denotes that the capacitors $C_D$ and $C_1$ are in parallel. Since the capacitance of $C_D$ is so large, this frequency is very low and negligible.

After a measured delay defined as δ2, the MOSFET Q2 is turned on by the timing circuit 42 while the diode D2 is conducting, thereby providing very low-voltage turn on for the MOSFET Q2. In particular, the voltage drop across the MOSFET Q2 is held at about 0.6 volts because of the diode D2. The delay δ2 is just sufficient to allow the diode D2 to begin to conduct, since otherwise the energy and the capacitor $C_D$ would be transferred to the capacitor C2. However, δ2 should be less than the time it takes for the secondary current $I_S$ to go to zero.

Thus, the proper selection of the regeneration capacitor $C_D$ eliminates overshoot and oscillation of the voltage $V_D$, so that a lower voltage rating is allowed for the MOSFET Q1. This is further accompanied by a lower $RDS_{ON}$ between

12 the drain and source of the MOSFET Q1 when the MOSFET Q1 is turned on. In particular, it is typical to use an 800 volt MOSFET for the MOSFET Q1 having an $RDS_{ON}$ value of 1.5 ohms for traditional flyback converters. A lesser voltage rating could cause catastrophic failure of the MOSFET Q1 due to the voltage overshoot 30. However, since there is almost no overshoot and very little oscillation on the voltage $V_D$ in the flyback converter of FIG. 3, a lower voltage rating may be used for the MOSFET Q1. For example, a 600 volt device having an $RDS_{ON}$ value of 0.5 ohms, or a 500 volt device having an $RDS_{ON}$ value of 0.4 ohms or possibly even a 400 volt device having an $RDS_{ON}$ value 0.3 ohms may be used instead. The use of these lower voltage MOSFETs allows a reduction in power loss by a factor of 3 to 4 in the MOSFET Q1. Therefore, the addition of the timing circuit 42 and the capacitor $C_D$ in conjunction with the MOSFET Q2 allows a significant increase in efficiency of the flyback converter.

At time T24, after the delay δ2, the –G2 signal is asserted by the timing circuit 42, thereby activating the MOSFET Q2. During this time, the capacitors $C_D$ and C2 are charged to approximately the same voltage as $V_D$, which is defined by the following equation 6:

$$V_D = V_{IN} + N(V_O + V_R)$$

As usual, the secondary current $I_S$ decreases linearly until a time T26, when the diode D3 turns off ending the flyback phase. Rather than the typical oscillations 40 experienced in the flyback converter of prior art when the secondary current $I_S$ goes to zero, the capacitor $C_D$ begins to drive negative current into the primary inductor 20, thus holding the voltage $V_D$ essentially constant. Thus, the damped oscillations 40 typically caused by the primary and leakage inductors 20, 23 and the capacitor C1 are effectively eliminated. Furthermore, the turn-off transition time of the diode D3 is greatly softened because the capacitor $C_D$ maintains the voltage across the primary inductor 20 and the secondary inductor 22. Therefore, the current spikes 36 and 38 are substantially reduced.

At time T26 until a time T28, a regeneration phase occurs where the capacitor $C_D$ discharges regeneration energy into the primary inductor 20. Thus, the primary current $I_P$ continues to ramp negatively during the regeneration phase, where the negative primary current $I_P$ between times T26 and T28 represents the regeneration energy. Subsequently, at time T28 corresponding to the end of the regeneration cycle and the beginning of the next power cycle, the PWM 21 asserts its output high and the timing circuit 42 turns off the MOSFET Q2 almost immediately. At this point, the voltage $V_D$ goes to zero and would typically want to "ring" negative due to oscillation between the capacitor C1 with the primary and leakage inductors 20, 23. However, the diode D1 clamps the voltage $V_D$ at about zero and prevents it from going negative. The negative source of the inductor current through the primary inductor 20 switches from the capacitor $C_D$ to the capacitor C1, which discharges quickly, turning the diode D1 on. After the measured delay δ1, the timing circuit 42 asserts the G1 signal high, turning on the MOSFET Q1 while its diode D1 is still conducting.

The delay δ1 must be sufficient to allow the voltage $V_D$ to be pulled to about zero volts. A greater delay might result in power loss in the diode D1 as excess current is conducted through the diode rather than the main junction of the power device. However, the delay should not be so long as would normally allow the voltage $V_D$ to ring back positive if the diode D1 were not present. When the MOSFET Q2 is turned off, the negative primary current $I_P$ ramps positive. The MOSFET Q1 should be turned on before the primary current $I_P$ goes positive at a time T31. The remaining portion of the cycle is identical to that described previously, although the width of the signals may vary depending upon the load conditions provided at the output of the flyback converter.

Figure 5:
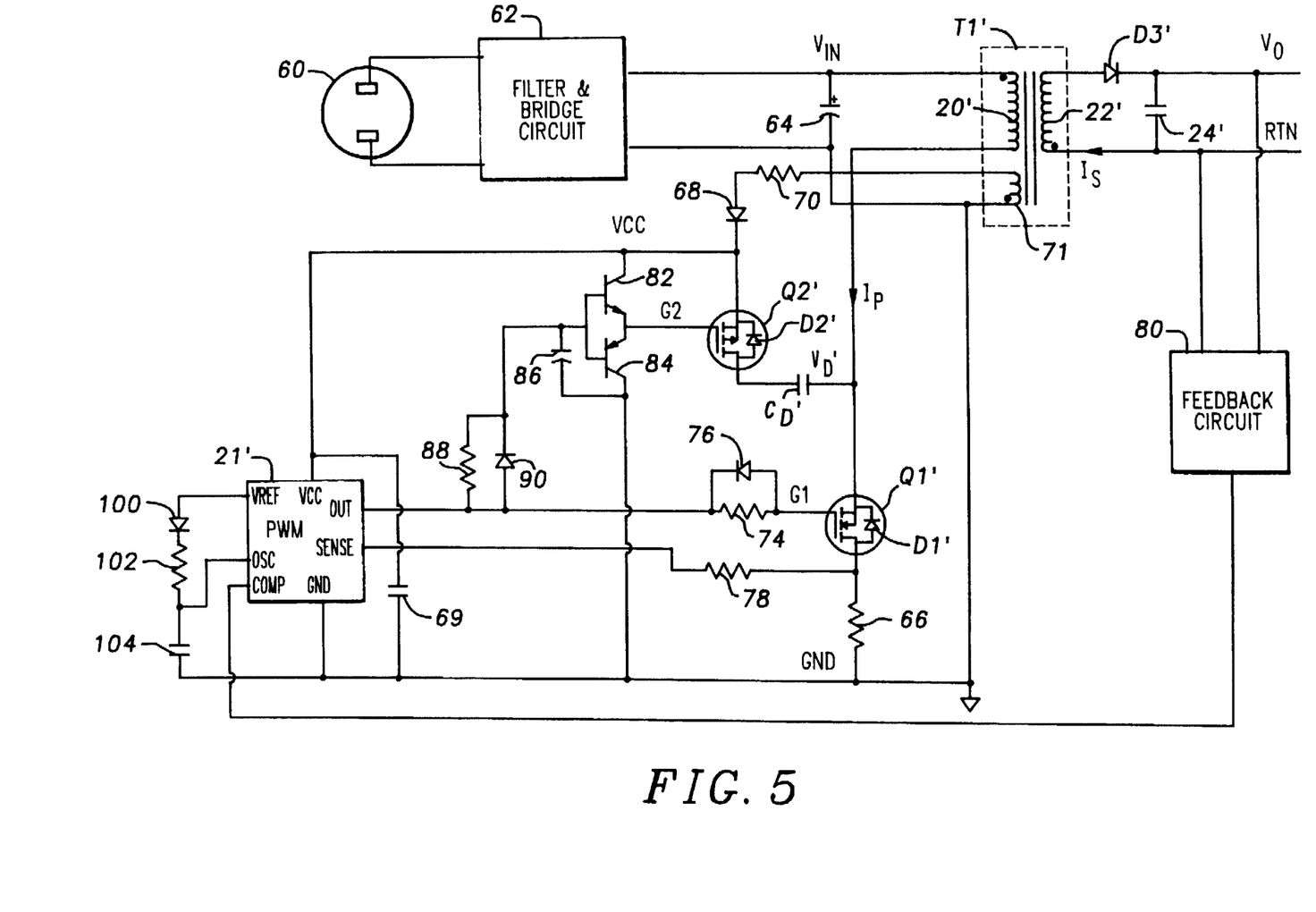
FIG. 5 is a more detailed schematic diagram illustrating a flyback power converter according to the present invention.

Referring now to FIG. 5, a more detailed schematic diagram is shown illustrating a flyback power converter according to the present invention including timing circuitry. Similar or corresponding components have the same reference numeral as those shown in FIG. 3, except followed by an apostrophe. The timing diagrams of FIG. 4 generally apply to the flyback converter of FIG. 5, except that the G2 signal is positive and reversed to properly control a p-channel MOSFET Q2'. The MOSFET Q2' corresponds to the MOSFET Q2, except that it is biased in a different manner, requiring a modified gate signal. Thus, the MOSFET Q2' operates in the same manner as the MOSFET Q2, being turned on and off during corresponding time periods as shown in FIG. 4, except that it is turned on when the G2 signal is negated low and turned off when the G2 signal is asserted high.

An AC source 60 is coupled to the input of a filter and bridge circuit 62. The filter and bridge circuit 62 converts the AC voltage from the AC source 60 to the relatively large, unregulated DC voltage $V_{IN}$. Again, the $V_{IN}$ signal is preferably between 100–400 volts. A filter capacitor 64 is coupled between the $V_{IN}$ signal and ground. The $V_{IN}$ signal is provided to the dotted terminal of a primary inductor 20' of a transformer T1', corresponding to the primary inductor 20 of the transformer T1. A leakage inductance exists corresponding to the leakage inductor 23, but is not shown for purposes of simplicity. The undotted terminal of the primary inductor 20' is connected to the drain terminal of an n-channel MOSFET Q1', corresponding to the MOSFET Q1.

The MOSFET Q1' includes an internal diode D1' and an internal drain to source capacitor (not shown) which operate similarly to the diode D1 and the capacitor C1. The source terminal of the MOSFET Q1' is connected to one end of a sense resistor 66 having its other end connected to ground. The undotted terminal of the primary inductor 20' is connected to one end of a regeneration capacitor $C_D'$ and the other end of the capacitor $C_D'$ is connected to the drain terminal of the MOSFET Q2'. The capacitor $C_D'$ corresponds to the capacitor $C_D$. The gate of the MOSFET Q2' receives the G2 signal and its source is connected to the cathode of a diode 68, having its anode connected to one end of a resistor 70. The other end of the resistor 70 is connected to the undotted terminal of an auxiliary winding 71 provided in the primary of the transformer T1'. The dotted terminal of the auxiliary winding 71 is connected to ground, so that the auxiliary winding provides power through the diode 68 during the flyback phase. A capacitor 69 is connected between the cathode of the diode 68 and ground. The voltage provided at the cathode of the diode 68 due to the auxiliary winding 71 is referred to as the VCC signal, which is preferably a relatively low DC reference voltage having a voltage level of about 5–12 volts. Thus, when the MOSFET Q2' is turned on, the capacitor $C_D'$ is coupled between the drain terminal of the MOSFET Q1' and the VCC signal. Since the VCC signal has a relatively low voltage, it serves as AC ground for purposes of the regeneration circuit.

The cathode of the diode 68 providing the VCC signal is connected to the VCC input of a PWM 21', which is similar to the PWM 21 and is used to control the operation of the flyback converter. The output of the PWM 21' is connected to one end of a resistor 74, which has its other end providing the G1 signal. In this manner, PWM 21' is used to turn on and off the MOSFET Q1'. A diode 76 receives the G1 signal at its anode and has its cathode connected to the output of the PWM 21'. The source of the MOSFET Q1' is connected to one end of a resistor 78 having its other end connected to a sense output of the PWM 21'. In this manner, the PWM 21' can sense the current flowing through the primary inductor 20' through the resistors 66 and 78. The PWM 21' has an output reference voltage, referred to as VREF, which is connected to the anode of a diode 100. The cathode of the diode 100 is connected to one end of a resistor 102, which has its other end connected to an oscillator input OSC of the PWM 21' and to one end of a capacitor 104. The other end of the capacitor 104 is connected to ground.

Pursuant to constant power techniques, the PWM 21' preferably operates at a constant frequency asserting its output high at the beginning of each power cycle having a fixed period. The PWM 21' negates its output when the primary current $I_P$ through the primary inductor 20' reaches a maximum value. The frequency of operation of the PWM 21' is preferably determined by the time constant defined by the resistor 102 and the capacitor 104 coupled to the OSC input of the PWM 21'. The OSC input of the PWM 21' acts in a similar manner as a 555 type timer, where the capacitor 104 is repeatedly charged and grounded to establish the operating frequency. During power-up, the PWM 21' keeps the VREF signal asserted low until an appropriate voltage is reached at its VCC input. Thus, the diode 100 is turned off, grounding the OSC input and preventing the PWM 21' from oscillating until it has sufficient power. Eventually, the VCC signal develops sufficient voltage so that the PWM 21' asserts its VREF output high. When the VREF output is asserted high, the diode 100 is forward biased, allowing the PWM 21' to oscillate at the desired frequency established by the RC time constant defined by the resistor 102 and the capacitor 104.

The transformer T1' includes a secondary inductor 22' having its undotted terminal connected to the anode of a diode D3' providing the $V_O$ signal at its cathode. The dotted terminal of the secondary inductor 22' is connected to one end of an output capacitor 24', having its other end connected to the cathode of the diode D3'. The secondary inductor 22', the diode D3' and the capacitor 24' correspond to the secondary inductor 22, the diode D3 and the capacitor 24, respectively, of the circuit of FIG. 3. The dotted terminal of the secondary inductor 22' provides a signal RTN. Again, the output voltage $V_O$ is defined between the $V_O$ and the RTN signals. A feedback circuit 80 has two inputs receiving the $V_O$ and RTN signals to sense the output voltage $V_O$ and provides an output to the PWM 21'. The feedback circuit 80 serves to provide loop compensation, typically comprising an opto-coupler for isolation between the primary and secondary portions of the flyback converter. In alternative embodiments, the feedback circuit 80 would be used by the PWM 21' to sense the output voltage $V_O$ or output current to control these parameters.

The cathode of the diode 68 is connected to the collector of an NPN bipolar transistor 82 having its emitter providing the G2 signal. The transistor 82 is connected in a totem-pole or push-pull fashion with a PNP bipolar transistor 84, where the base and emitter terminals of the transistors 82 and 84 are connected together. The collector of the transistor 84 is connected to ground and also to one end of a timing capacitor 86. The other end of the capacitor 86 is connected to the base terminals of the transistors 82 and 84 and also to one end of a resistor 88 and the cathode of a diode 90. The other end of the resistor 88 and the anode of the diode 90 is connected to the output of the PWM 21'. It is noted that the resistors 74, 88, the capacitor 86 and the diodes 76, 90 provide the timing functions corresponding to the timing circuit 42 of FIG. 3.

The operation of the flyback converter of FIG. 5 will now be described. Each cycle begins when the PWM 21' asserts its output high, corresponding to times T18 and T28 shown in FIG. 4. Due to the diode 90, the base terminals of the transistors 82 and 84 are immediately pulled high, turning on the transistor 82 and turning off the transistor 84. The G2 signal is asserted high, thereby turning off the MOSFET Q2', so that the negative primary current $I_P$ flowing through the primary inductor 20' begins to ramp positive. Due to the resistor 74 and the gate to source capacitance of the MOSFET Q1', the G1 signal does not rise until after the delay $\delta 1$. The delay $\delta 1$ is defined by the resistance/capacitance (RC) time constant of the resistor 74 and the gate to source capacitance of the MOSFET Q1'.

When the primary current $I_P$ flowing through the primary inductor 20' reaches a maximum value, the PWM 21' negates its output low at time T22. Due to the operation of the diode 76, the G1 signal is pulled low almost immediately, thereby turning off the MOSFET Q1' and initiating the flyback phase. However, the resistor 88 and the capacitor 86 implement the delay $\delta 2$ defined by their RC time constant before the MOSFET Q2' is turned on. In particular, the RC time constant of the resistor 88 and the capacitor 86 is chosen to pull the base terminals of the transistors 82 and 84 low only after the delay $\delta 2$ after negation of the PWM 21' output, so that the transistor 82 is turned off and the transistor 84 is turned on at time T24. The G2 signal is also asserted negative turning on the MOSFET Q2' at time T24.

The residual primary current $I_P$ flowing through the primary inductor 20' is shared between the drain to source capacitor of the MOSFET Q1' and the large capacitance $C_D$', so that the voltage overshoot of the voltage $V_D$ is negligible as described previously for the voltage $V_D$. While the diode D2' is conducting, the MOSFET Q2' is turned on, thus providing low voltage turn-on of the MOSFET Q2'. Eventually, the secondary current $I_S$ goes to zero ending the flyback phase and the capacitor $C_D$' causes the secondary current $I_P$ to go negative when the diode D3' is turned off during the regeneration phase. At the end of the power cycle, the PWM 21' asserts its output high once again, turning the MOSFET Q2 off almost immediately. The capacitor $C_D$', providing negative current into the primary inductor 20', is switched out of the circuit so that the drain to source capacitor of the MOSFET Q1' must provide the negative primary current $I_P$, thereby turning on the diode D1'. After the delay $\delta 1$, the MOSFET Q1' is again turned on while the diode D1' is conducting. This provides for very low voltage turn on of the MOSFET Q1' as described previously.

In this manner, PWM 21' is used in conjunction with the resistors 74, 78, the capacitor 86 and the diodes 76 and 90 to establish the appropriate complementary timing between the MOSFETs Q1' and Q2'. These timing parts are relatively inexpensive and readily available components which consume little extra space.

The transistors 82 and 84 are not necessary, but provide enhanced operation during no-load or light load conditions. During no-load or light load conditions, the MOSFET Q1' is turned on only for a short time. Also, the secondary current flow of the flyback phase is very short, so that the secondary current $I_S$ may reach zero before the MOSFET Q2' is turned back on. Thus, the secondary current $I_S$ current reaches zero faster than the delay $\delta 2$. While the secondary current $I_S$ is flowing, the diode D3' is turned on and the output voltage $V_O$ is reflected to the primary inductor 20' multiplied by the turns ratio N This causes a current flow through the capacitor $C_D$' and the diode D2' of the MOSFET Q2', keeping the diode D2' on. It is desirable to turn MOSFET Q2' on while the diode D2' is conducting to provide very low voltage turn on. However, if the secondary current $I_S$ reaches zero before the delay $\delta 2$, the MOSFET Q2' would be turned on relatively slowly in a high voltage situation due to the resistor 88 and capacitor 86, generating significant power loss through the MOSFET Q2'. The transistors 82 and 84 prevent this situation, allowing rapid transition of turn-on of the MOSFET Q2' under all conditions, so that the MOSFET Q2' does not consume appreciable power even in light or no-load situations.

Various design parameters and constraints dictate the mode of operation of a flyback power converter, such as the one shown in FIG. 5. For example, the duty cycle of the converter, referred to as $\delta$, may be confined to a particular range depending upon power level and the physical characteristics of the components such as the transformer T1'. The duty cycle $\delta$ is defined as the time period of the primary conduction phase divided by the total time period of the power cycle. For example, referring to FIG. 4, the duty cycle $\delta$ is the time period T18–T22 divided by the total time period T18–T28 for each cycle. For purposes of the present invention, another important parameter is the regeneration energy of the primary inductor 20' corresponding to the negative primary current $I_P$ between times T26 and T28. Changes in the $V_{IN}$ signal and the $V_O$ signal will have an affect on the duty cycle $\delta$ and the regeneration energy. For some applications, the variations of the $V_{IN}$ and $V_O$ signals are small so that the effect on operation is negligible. However, as will be described below, in other applications the $V_{IN}$ and $V_O$ signals may vary considerably, causing a reduction in operating efficiency, so that compensation is considered desirable.

The flyback power converter shown in FIG. 5 may be intended to operate with a broad range of AC input voltages to handle domestic and international voltage levels. Consequently, the $V_{IN}$ signal may range from approximately 100 volts to as much as approximately 400 volts. Referring again to FIG. 4, a decrease of the $V_{IN}$ signal causes the primary current $I_P$ to rise proportionately slower. Since the primary current $I_P$ must eventually reach a predetermined maximum before the flyback phase is initiated, the time period between time T18 and T22 is increased. Assuming fixed frequency, this change increases the duty cycle $\delta$ and decreases the regeneration energy, which could reduce efficiency. In a similar manner, a decrease of the $V_O$ signal causes the secondary current $I_S$ to decrease more slowly, directly reducing the regeneration energy available at the beginning of the next cycle. Although the efficiency is still greater with the benefit of the present invention, further compensation is considered desirable to maintain the highest efficiency possible.

Figure 6:
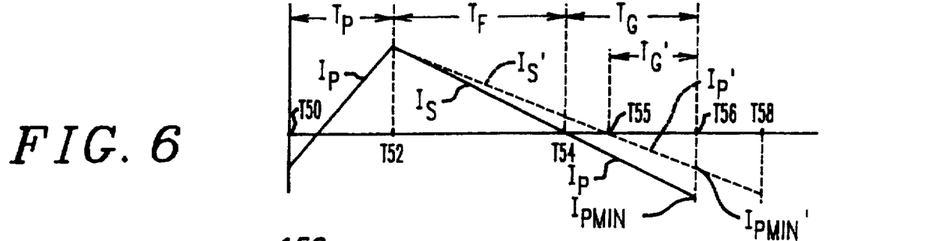
FIG. 6 shows a composite current graph illustrating the affects on operation due to changes of the output voltage for a flyback converter according to the present invention.

To illustrate the situation more clearly, a composite current graph is shown in FIG. 6 for a given duty cycle $\delta$ and $V_{IN}$ signal. Between a time T50 and a time T52, the primary conduction phase period is shown, referred to by the symbol $T_P$, where the primary current $I_P$ is rising. The flyback phase period, referred to by the symbol $T_F$, occurs between time T52 and a time T54 while the secondary current $I_S$ is conducting and decreasing. Finally, the regeneration phase period, referred to by the symbol $T_G$, occurs between time T54 and a time T56 while the primary current $I_P$ is negative and increasing in magnitude. At time T56, the primary current $I_P$ reaches a minimum value, referred to as $I_{PMIN}$, having a magnitude related to the desired regeneration energy.

If the $V_O$ signal decreases significantly, which may occur when a discharged rechargeable battery is installed at the output, the secondary current $I_S$ will decrease more slowly. In FIG. 6, a dotted line illustrates the new secondary current $I_S'$ which does not fall to zero until a time T55, which occurs after time T54. After time T55, The capacitor $C_D$ drives negative primary current $I_P$ into the primary inductor 20', as shown by another dotted line $I_P'$. Assuming fixed frequency, the cycle ends at time T56, where the primary current $I_P'$ reaches a minimum value $I_{PMIN}'$, where $I_{PMIN}'$ has a smaller magnitude than $I_{PMIN}$. The smaller magnitude of $I_{PMIN}'$ occurs since the new regeneration period $T_G'$ between times T55 and T56 is smaller than the original regeneration period $T_G$. Therefore, a decrease in the $V_O$ signal causes a decrease in the regeneration energy. However, it is desired to increase the regeneration energy and period $T_G$ with a decrease of the $V_O$ signal. The required regeneration period $T_G$ for a given primary inductance $L_P$, a drain to source capacitor $C_1$, an input voltage $V_{IN}$, an output voltage $V_O$ and a turns ratio N, is defined by the following equation 7:

$$T_G = \frac{\sqrt{L_P C_1} \ (V_{IN} + V_O N)}{V_O N}$$

From equation 6, it is seen that a decrease in the $V_O$ signal, causes an increase in the desired regeneration period $T_G$. Since the regeneration period is decreased, the desired regeneration energy is not achieved.

It is noted that if the total period of the power cycle is extended beyond time T56 to a time T58, the negative peak current $I_P'$ will reach a greater minimum value. The extension of the total period represents a decrease in the operating frequency of the flyback converter. Therefore, to achieve the desired regeneration energy for a decrease in output voltage, it is desirable to decrease the operating frequency of flyback converter by an appropriate amount to compensate for the lost amount of regeneration energy.

Figure 7A:
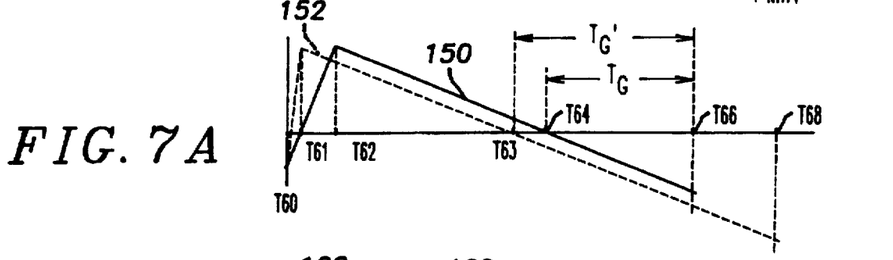
FIGS. 7A and 7B show composite current graphs illustrating the affects on operation due to changes of the input voltage for low and high duty cycles, respectively, for a flyback converter according to the present invention.

Referring now to FIG. 7A, another composite current graph is shown illustrating the effect of an increase of the $V_{IN}$ signal by a factor of four for a flyback converter according to the present invention operating at a small duty cycle. A first curve 150 shows a cycle which begins at a time T60, where the primary conduction period $T_P$ completes at a time T62, the regeneration period $T_G$ starts at a time T64 and the entire cycle completes at a time T66. A second dotted line curve 152 is shown illustrating the affect of increasing the $V_{IN}$ signal by a factor of about four. The primary current $I_P$ rises about 4 times faster, so that the primary conduction period $T_P$ is about four times smaller completing at a time T61 before time T62. Assuming the $V_O$ signal is constant, the duration of flyback phase is not affected, so that the new regeneration period $T_G'$ begins earlier at a time T63 and is correspondingly increased. However, since the duty cycle δ is decreased only by a relatively small amount, the regeneration period increases by a small amount so that $T_G'$ is not much greater than $T_G$. Thus, the regeneration energy does not increase appreciably either.

In the preferred embodiment, it is desired that the regeneration energy increase by a much larger factor than that shown in FIG. 7A when the $V_{IN}$ signal increases by a factor of four. To achieve the desired regeneration energy, it is desired to increase the period of the cycle to a time T68 as shown in FIG. 7A. Thus, for low duty cycles, it is desired to decrease the operating frequency with an increase in the $V_{IN}$ signal to achieve the desired regeneration energy.

Figure 7B:
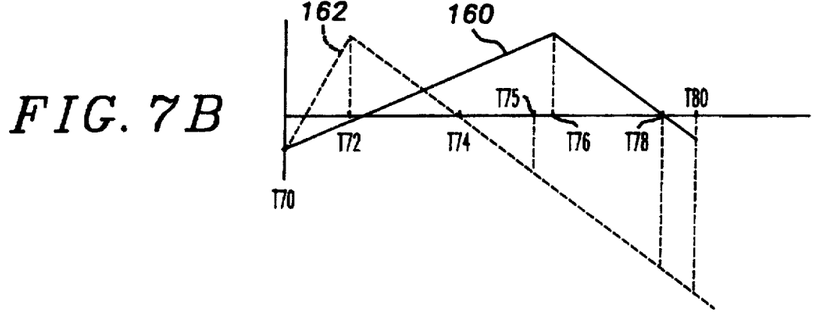

Referring now to FIG. 7B, another composite current graph is shown for a flyback converter according to the present invention operating with a large duty cycle. A first curve 160 illustrates the low $V_{IN}$ signal case where the cycle begins at a time T70, the primary conduction period ends at a time T76, the secondary current $I_S$ goes to zero at a time T78 and the entire cycle ends at a time T80. A second dotted line curve 162 illustrates the $V_{IN}$ signal increased by a factor of four, where the primary conduction period $T_P$ ends in one-fourth the time at a time T72, and where the secondary current $I_S$ goes to zero early at a time T74. The regeneration energy builds between times T74 and T80 as shown. Since the duty cycle δ is relatively large due to low input voltage, there is a dramatic increase in the regeneration period $T_G$ when the $V_{IN}$ signal is increased, and thus a corresponding large increase of the regeneration energy. Although an increase is desired, the regeneration energy increases disproportionately, so that the regeneration period must be decreased by increasing the frequency of operation. For example, it may be desired to terminate the cycle early at a time T75 to achieve the desired regeneration energy. Thus, if the $V_{IN}$ signal is increased in a flyback converter according to the present invention having a relatively large duty cycle δ, it is desired to correspondingly increase the frequency.

It is seen from FIGS. 7A and 7B that there is an optimal intermediate duty cycle, where the frequency of operation need not be changed regardless of changes of the $V_{IN}$ signal. However, the duty cycle δ may be constrained by other more critical design considerations, so that the optimal duty cycle δ may not be achievable for every flyback circuit.

Figure 8:
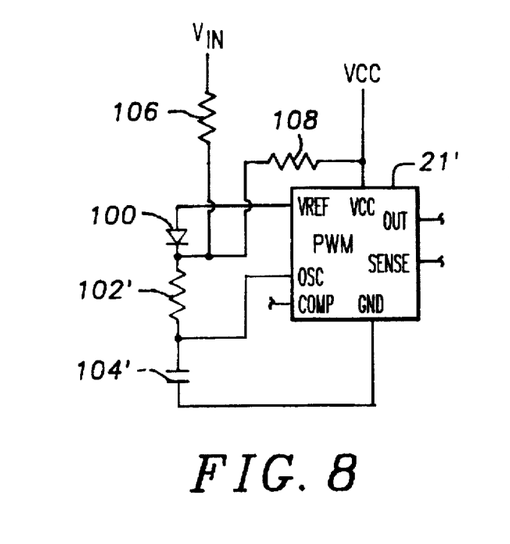
FIG. 8 is a schematic diagram illustrating improvements of the flyback converter of FIG. 5, where the operating frequency is varied proportionately with changes of the input or output voltages.

Referring now to FIG. 8, a portion of the flyback converter shown in FIG. 5 is shown including some modifications for improved operation. In particular, a resistor 106 is coupled between the $V_{IN}$ signal and the cathode of the diode 100. Also, a resistor 108 is coupled between the VCC input of the PWM 21' and the cathode of the diode 100. A resistor 102' and a capacitor 104' replace the resistor 102 and capacitor 104', respectively. The function of the resistor 102' and capacitor 104' is similar, except their values are modified depending upon whether the resistor 106, the resistor 108, or both are added to the circuit. The remaining portions of the flyback converter are the same and are not shown for purposes of simplicity.

The frequency of operation of the PWM 21' is defined by the rate the capacitor 104' is charged. Ignoring the resistor 108 for the moment, the rate of charge of the capacitor 104' depends on the resistor 102' the resistor 106 and the $V_{IN}$ signal. Therefore the frequency of operation of the PWM 21' of FIG. 8 is varied proportionately with the $V_{IN}$ signal. This modification corresponds to the compensation desired as illustrated with the graph shown in FIG. 7B for the large duty cycle case, where it is desired to increase the frequency for an increase in the $V_{IN}$ signal. Furthermore, the frequency of operation of the PWM 21' is also varied proportionately with changes in the $V_O$ signal with the addition of the resistor 108. The value of the resistor 108 is chosen to achieve the desired frequency change corresponding to changes of the VCC signal. This situation corresponds to the graph shown in FIG. 6. In either case, as described above, the change in operation frequency allows a corresponding change in the time period that the primary current $I_P$ ramps negative, allowing the primary current $I_P$ to reach the desired negative peak. While this very simple compensation circuit does not produce the exact change required for ideal performance, the flyback power converter operates at a much more optimum efficiency with changes in the $V_{IN}$ and $V_O$ signals.

It is noted that the resistors 106 and 108 are essentially independent of each other, so that one, the other or both may be installed depending upon the compensation desired. The values of the resistors 106, 108, 102' and the capacitor 104' may be different depending upon the combination used. These values are merely a matter of design choice and will depend upon the specific implementation.

Figure 9:
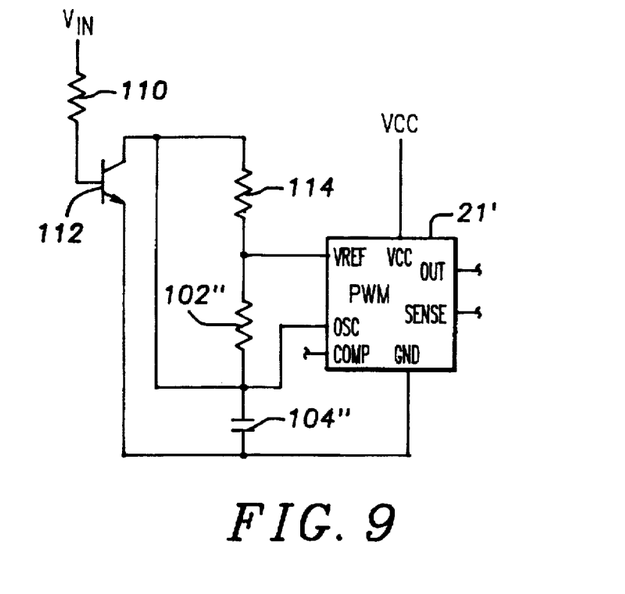
FIG. 9 is a schematic diagram illustrating an improvement of the flyback converter of FIG. 5, where the operating frequency is varied inversely with changes of the input voltage.

Referring now to FIG. 9, another schematic diagram is shown illustrating an improvement where the frequency is varied inversely with changes of the $V_{IN}$ signal. This is the appropriate embodiment for the small duty cycle case illustrated in FIG. 7A. The $V_{IN}$ signal is provided to one end of a resistor 110, which has its other end connected to the base of an NPN bi-polar transistor 112. The emitter of the transistor 112 is connected to ground, and its collector is connected to one end of a resistor 114 and to the OSC input of the PWM 21'. The other end of the resistor 114 is provided to the VREF input of the PWM 21'.

A resistor 102" and a capacitor 104" replace the resistor 102 and the capacitor 104, respectively. The transistor 112 is operated in its active state. Thus, as the $V_{IN}$ signal is increased, the current through the collector to emitter path is increased allowing greater charge time for the capacitor 104". In this manner, the frequency of operation is decreased. The resistor values and bias point of the transistor 112 is chosen to achieve the desired change in frequency per changes of the $V_{IN}$ signal. Referring back to FIG. 7A, for example, a four to one increase of the $V_{IN}$ signal decreases the operating frequency so that the total period of the power cycle ends at time T68 as appropriate. It is noted that the resistor 108 may be added to the circuit of FIG. 9 if compensation of the $V_O$ signal is desired. The values of the resistors and the capacitor 104" depends on the combination used and the compensation desired, which depends on the specific embodiment.

As described throughout this disclosure, there are multiple advantages of the present invention. The regeneration switch implemented by the MOSFET Q2 or Q2' allows the use of a regeneration capacitor $C_D$ having a very large capacitance. The regeneration capacitor overdamps the circuit eliminating the otherwise significant voltage overshoot 30 and damped oscillators 32 during switching between the primary conduction and flyback phases. Also, the regeneration capacitor holds the voltage across the primary and secondary inductors of the transformer constant by providing negative primary current after the current in the secondary reaches zero, eliminating the oscillations 40. When the regeneration capacitor is switched, the drain to source capacitor of the primary switch must provide this current, thereby allowing very low voltage turn on of the primary switch. The use of the regeneration capacitor also substantially reduces current spikes 26, 28, 36, and 38. In alternative embodiments, simple components such as resistors or simple transistor circuits may be added to compensate for changes in the input or output voltage signals as desired.

All these advantages are achieved with simple, inexpensive and common components, resulting in a highly efficient, cost-effective and reduced-size power supply. In fact, efficiencies of over 90% have been achieved without using other design techniques, where 15–17% of the increase is due to the present techniques alone.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A complementary regeneration circuit for improving the operation of a flyback power converter, wherein the flyback converter includes means for providing a DC voltage source, means for providing a DC reference voltage of ground, a transformer having a primary inductor and a secondary inductor, wherein the primary inductor is connected to the DC source, a primary switch having a control terminal and a current path between a first terminal and a second terminal, a primary diode having its anode connected to the second terminal and its cathode connected to the first terminal of the primary switch, the primary switch having the current path between its first and second terminals electrically coupled in series with the primary inductor, a pulse-width modulation circuit having an output for controlling each power cycle and an output circuit coupled to the secondary inductor to implement flyback converter operation, the complementary regeneration circuit comprising:

a regeneration capacitor having a first terminal and a second terminal, wherein said first terminal is coupled to the first terminal of the primary switch;

a regeneration switch having a control terminal and two terminals having a current path between them, wherein a first terminal is connected to said second terminal of said regeneration capacitor and a second terminal is connected to the DC reference voltage means;

a regeneration diode coupled in parallel with the current path of said regeneration switch and having its anode coupled to said second terminal of said regeneration capacitor and its cathode coupled to said DC reference voltage means; and a timing circuit having an input for receiving the output of the pulse width modulation circuit and a first output for coupling to the control terminal of the primary switch and a second output coupled to said control terminal of said regeneration switch, wherein said timing circuit turns off said regeneration switch in response to the pulse width modulation circuit asserting its output to initiate a power cycle and subsequently turns on the primary switch after a first delay from when said pulse width modulation circuit asserts its output, and turns off the primary switch in response to the pulse width modulation circuit negating its output to initiate a flyback phase of the power cycle and subsequently turns on said regeneration switch after a second delay from when said pulse width modulation circuit negates its output, wherein said regeneration switch comprises a p-channel MOSFET having its drain connected to said second terminal of said regeneration capacitor and its source connected to ground, said p-channel MOSFET including an inherent diode serving as said regeneration diode having its anode connected to the drain and its cathode connected to the source of said p-channel MOSFET; and wherein the primary switch comprises an n-channel MOSFET having its drain coupled to the transformer primary and its source coupled to ground, and wherein its gate is the control terminal of the primary switch.

2. The complementary regeneration circuit of claim 1, wherein said first delay is completed when the voltage of the drain of the primary switch reaches approximately zero volts and while said inherent diode of the primary switch is still conducting; and said second delay is sufficient to allow the primary switch to turn fully off while said regeneration diode still conducting.

3. A complementary regeneration circuit for improving the operation of a flyback power converter, wherein the flyback converter includes means for providing a DC voltage source, means for providing a DC reference voltage of ground, a transformer having a primary inductor and a secondary inductor, wherein the primary inductor is connected to the DC source, a primary switch having a control terminal and a current path between a first terminal and a second terminal, a primary diode having its anode connected to the second terminal and its cathode connected to the first terminal of the primary switch, the primary switch having the current path between its first and second terminals electrically coupled in series with the primary inductor, a pulse-width modulation circuit having an output for controlling each power cycle and an output circuit coupled to the secondary inductor to implement flyback converter operation, the complementary regeneration circuit comprising:

a regeneration capacitor having a first terminal and a second terminal, wherein said first terminal is coupled to the first terminal of the primary switch;

a regeneration switch having a control terminal and two terminals having a current path between them, wherein a first terminal is connected to said second terminal of said regeneration capacitor and a second terminal is connected to the DC reference voltage means;

a regeneration diode coupled in parallel with the current path of said regeneration switch and having its anode coupled to said second terminal of said regeneration capacitor and its cathode coupled to said DC reference voltage means; and a timing circuit having an input for receiving the output of the pulse width modulation circuit and a first output for coupling to the control terminal of the primary switch and a second output coupled to said control terminal of said regeneration switch, wherein said timing circuit turns off said regeneration switch in response to the pulse width modulation circuit asserting its output to initiate a power cycle and subsequently turns on the primary switch after a first delay from when said pulse width modulation circuit asserts its output, and turns off the primary switch in response to the pulse width modulation circuit negating its output to initiate a flyback phase of the power cycle and subsequently turns on said regeneration switch after a second delay from when said pulse width modulation circuit negates its output, wherein the means for providing the DC reference voltage comprises an auxiliary winding on the transformer and a rectifier circuit coupled to the auxiliary winding for providing the DC reference voltage having a predetermined voltage level above ground.

4. The complementary regeneration circuit of claim 3, wherein said regeneration switch comprises a p-channel MOSFET having its drain connected to said second terminal of said regeneration capacitor and its source receiving the DC reference voltage, said p-channel MOSFET including an inherent diode serving as said regeneration diode having its anode connected to the drain and its cathode connected to the source of said p-channel MOSFET; and wherein the primary switch comprises an n-channel MOSFET having its drain coupled to the primary inductor and its source receiving the DC reference voltage, and wherein its gate is the control terminal of the primary switch.

5. The complementary regeneration switch of claim 4, further comprising:

a totem-pole driver circuit having an input coupled to said second output of said timing circuit and an output coupled to said control terminal of said regeneration switch.

6. The complementary regeneration circuit of claim 5, wherein said totem-pole driver comprises:

an NPN bipolar transistor having its collector receiving the DC reference voltage, its emitter coupled to said control terminal of said regeneration switch and its base coupled to said second output of said timing circuit; and a PNP transistor having its emitter coupled to said control terminal of said regeneration switch, its collector coupled to ground and its base coupled to said base of said NPN transistor.

7. A complementary regeneration circuit for improving the operation of a flyback power converter, wherein the flyback converter includes means for providing a DC voltage source, means for providing a DC reference voltage of ground, a transformer having a primary inductor and a secondary inductor, wherein the primary inductor is connected to the DC source, a primary switch having a control terminal and a current path between a first terminal and a second terminal, a primary diode having its anode connected to the second terminal and its cathode connected to the first terminal of the primary switch, the primary switch having the current path between its first and second terminals electrically coupled in series with the primary inductor, a pulse-width modulation circuit having an output for controlling each power cycle and an output circuit coupled to the secondary inductor to implement flyback converter operation, the complementary regeneration circuit comprising:

a regeneration capacitor having a first terminal and a second terminal, wherein said first terminal is coupled to the first terminal of the primary switch;

a regeneration switch having a control terminal and two terminals having a current path between them, wherein a first terminal is connected to said second terminal of said regeneration capacitor and a second terminal is connected to the DC reference voltage means;

a regeneration diode coupled in parallel with the current path of said regeneration switch and having its anode coupled to said second terminal of said regeneration capacitor and its cathode coupled to said DC reference voltage means; and a timing circuit having an input for receiving the output of the pulse width modulation circuit and a first output for coupling to the control terminal of the primary switch and a second output coupled to said control terminal of said regeneration switch, wherein said timing circuit turns off said regeneration switch in response to the pulse width modulation circuit asserting its output to initiate a power cycle and subsequently turns on the primary switch after a first delay from when said pulse width modulation circuit asserts its output, and turns off the primary switch in response to the pulse width modulation circuit negating its output to initiate a flyback phase of the power cycle and subsequently turns on said regeneration switch after a second delay from when said pulse width modulation circuit negates its output, wherein said timing circuit comprises:

a first diode having its anode for coupling to the control terminal of the primary switch and its cathode for receiving the output of the pulse width modulation circuit;

a first resistor electrically coupled in parallel with said first diode;

a second diode having its anode for receiving the output of the pulse width modulation circuit and its cathode coupled to said control terminal of said regeneration switch;

a second resistor electrically coupled in parallel with said second diode; and a capacitor having a first terminal coupled to ground and a second terminal coupled to said control terminal of said regeneration switch.

8. A complementary regeneration circuit for improving the operation of a flyback power converter, wherein the flyback converter includes means for providing a DC voltage source, means for providing a DC reference voltage of ground, a transformer having a primary inductor and a secondary inductor, wherein the primary inductor is connected to the DC source, a primary switch having a control terminal and a current path between a first terminal and a second terminal, a primary diode having its anode connected to the second terminal and its cathode connected to the first terminal of the primary switch, the primary switch having the current path between its first and second terminals electrically coupled in series with the primary inductor, a pulse-width modulation circuit having an output for controlling each power cycle and an output circuit coupled to the secondary inductor to implement flyback converter operation, the complementary regeneration circuit comprising:

a regeneration capacitor having a first terminal and a second terminal, wherein said first terminal is coupled to the first terminal of the primary switch;

a regeneration switch having a control terminal and two terminals having a current path between them, wherein a first terminal is connected to said second terminal of said regeneration capacitor and a second terminal is connected to the DC reference voltage means;

a regeneration diode coupled in parallel with the current path of said regeneration switch and having its anode coupled to said second terminal of said regeneration capacitor and its cathode coupled to said DC reference voltage means; and a timing circuit having an input for receiving the output of the pulse width modulation circuit and a first output for coupling to the control terminal of the primary switch and a second output coupled to said control terminal of said regeneration switch, wherein said timing circuit turns off said regeneration switch in response to the pulse width modulation circuit asserting its output to initiate a power cycle and subsequently turns on the primary switch after a first delay from when said pulse width modulation circuit asserts its output, and turns off the primary switch in response to the pulse width modulation circuit negating its output to initiate a flyback phase of the power cycle and subsequently turns on said regeneration switch after a second delay from when said pulse width modulation circuit negates its output, wherein the flyback converter further includes a feedback circuit having an input coupled to the output circuit and having an output providing a compensation signal to the pulse width modulation circuit.

9. The complementary regeneration circuit of claim 8, wherein the pulse width modulation circuit of the flyback converter includes a sense input for receiving a signal indicative of the level of current flowing through the transformer primary, wherein the pulse width modulation circuit operates at a constant frequency asserting its output at fixed intervals and negating its output when the current flowing through the primary inductor of the transformer reaches a predetermined maximum value, said complementary regeneration circuit further comprising:

a sense resistor electrically coupled in series between the second terminal of the primary switch and ground providing said signal indicative of the level of current flowing through the primary inductor.

10. A flyback converter, comprising:

means for providing a DC source voltage;

means for providing a DC reference voltage of ground;

a transformer having a primary inductor and a secondary inductor, wherein said primary inductor has a first terminal and a second terminal, wherein said primary inductor second terminal is coupled to said DC source voltage providing means and receives said DC source voltage;

a primary switch having a control terminal and a current path between a first terminal and a second terminal, wherein said first terminal is coupled to said second terminal of said primary inductor and said second terminal of said primary switch is coupled to ground, said primary switch including a diode wherein said primary switch diode has its anode connected to said second terminal of said primary switch and its cathode connected to said first terminal of said primary switch;

a pulse width modulation circuit having an output for controlling consecutive power cycles of the flyback converter;

an output circuit coupled to said secondary inductor of said transformer to implement flyback operation; and a complementary regeneration circuit, comprising:

a regeneration capacitor having a first terminal and a second terminal, wherein said first terminal and a second terminal, wherein said first terminal of said regeneration capacitor is coupled to said first terminal of said primary switch;

a regeneration switch having a control terminal and two terminals having a current path between them, wherein a first terminal is connected to said regeneration capacitor and a second terminal is connected to said DC reference voltage providing means;

a regeneration diode electrically coupled in parallel with said current path of said regeneration switch and having its anode coupled to said second terminal of said regeneration capacitor and its cathode coupled to said DC reference voltage providing means; and a timing circuit having an input for receiving the output of said pulse width modulation circuit and a first output coupled to said control terminal of said primary switch and a second output coupled to said control terminal of said regeneration switch, wherein said timing circuits turns off said regeneration switch in response to said pulse width modulation circuit asserting its output to initiate a power cycle and subsequently turns on said primary switch after a first delay from when said pulse width modulation circuit asserts its output, and turns off said primary switch in response to said pulse width modulation circuit negating its output initiating a flyback phase of a power cycle, and subsequently turns on said regeneration switch after a second delay from when said pulse width modulation circuit negates its output, wherein said regeneration switch comprises a p-channel MOSFET having its drain connected to said second terminal of said regeneration capacitor and its source connected to ground, said p-channel MOSFET including an inherent diode serving as said regeneration diode having its anode connected to the drain and its cathode connected to the source of said p-channel MOSFET.

11. The flyback converter of claim 10, wherein said first delay is completed when the voltage of said first terminal of said primary switch reaches zero volts and while said inherent diode of said primary switch is still conducting; and said second delay is completed when said primary switch turns off and while said regeneration diode is conducting.

12. A flyback converter, comprising:

means for providing a DC source voltage;

means for providing a DC reference voltage of ground;

a transformer having a primary inductor and a secondary inductor, wherein said primary inductor has a first terminal and a second terminal, wherein said primary inductor second terminal is coupled to said DC source voltage providing means and receives said DC source voltage;

a primary switch having a control terminal and a current path between a first terminal and a second terminal, wherein said first terminal is coupled to said second terminal of said primary inductor and said second terminal of said primary switch is coupled to ground, said primary switch including a diode wherein said primary switch diode has its anode connected to said second terminal of said primary switch and its cathode connected to said first terminal of said primary switch;

a pulse width modulation circuit having an output for controlling consecutive power cycles of the flyback converter;

an output circuit coupled to said secondary inductor of said transformer to implement flyback operation; and a complementary regeneration circuit, comprising:

a regeneration capacitor having a first terminal and a second terminal, wherein said first terminal and a second terminal, wherein said first terminal of said regeneration capacitor is coupled to said first terminal of said primary switch;

a regeneration switch having a control terminal and two terminals having a current path between them, wherein a first terminal is connected to said regeneration capacitor and a second terminal is connected to said DC reference voltage providing means;

a regeneration diode electrically coupled in parallel with said current path of said regeneration switch and having its anode coupled to said second terminal of said regeneration capacitor and its cathode coupled to said DC reference voltage providing means; and a timing circuit having an input for receiving the output of said pulse width modulation circuit and a first output coupled to said control terminal of said primary switch and a second output coupled to said control terminal of said regeneration switch, wherein said timing circuits turns off said regeneration switch in response to said pulse width modulation circuit asserting its output to initiate a power cycle and subsequently turns on said primary switch after a first delay from when said pulse width modulation circuit asserts its output, and turns off said primary switch in response to said pulse width modulation circuit negating its output initiating a flyback phase of a power cycle, and subsequently turns on said regeneration switch after a second delay from when said pulse width modulation circuit negates its output, wherein said DC reference voltage providing means comprises:

an auxiliary winding provided within said transformer; and a rectifier circuit coupled to the auxiliary winding to provide said DC reference voltage.

13. The flyback converter of claim 12, wherein said regeneration switch comprises a p-channel MOSFET having its drain connected to said second end of said capacitor and its source receiving said DC reference voltage, said p-channel MOSFET including an inherent diode serving as said regeneration diode having its anode connected to the drain and its cathode connected to the source of said p-channel MOSFET.

14. The flyback converter of claim 13, further comprising:

a totem-pole driver having an input coupled to said second output of said timing circuit and an output coupled to said control terminal of said regeneration switch.

15. The flyback converter of claim 14, wherein said totem-pole driver comprises:

an NPN bipolar transistor having its collector receiving said DC reference voltage, its emitter coupled to said control terminal of said regeneration switch and its base coupled to said second output of said timing circuit; and a PNP transistor having its emitter coupled to said control terminal of said regeneration switch, its collector coupled to ground and its base coupled to the base of said NPN transistor.

16. A flyback converter, comprising:

means for providing a DC source voltage;

means for providing a DC reference voltage of ground;

a transformer having a primary inductor and a secondary inductor, wherein said primary inductor has a first terminal and a second terminal, wherein said primary inductor second terminal is coupled to said DC source voltage providing means and receives said DC source voltage;

a primary switch having a control terminal and a current path between a first terminal and a second terminal, wherein said first terminal is coupled to said second terminal of said primary inductor and said second terminal of said primary switch is coupled to ground, said primary switch including a diode wherein said primary switch diode has its anode connected to said second terminal of said primary switch and its cathode connected to said first terminal of said primary switch;

a pulse width modulation circuit having an output for controlling consecutive power cycles of the flyback converter;

an output circuit coupled to said secondary inductor of said transformer to implement flyback operation; and a complementary regeneration circuit, comprising:

a regeneration capacitor having a first terminal and a second terminal, wherein said first terminal and a second terminal, wherein said first terminal of said regeneration capacitor is coupled to said first terminal of said primary switch;

a regeneration switch having a control terminal and two terminals having a current path between them, wherein a first terminal is connected to said regeneration capacitor and a second terminal is connected to said DC reference voltage providing means;

a regeneration diode electrically coupled in parallel with said current path of said regeneration switch and having its anode coupled to said second terminal of said regeneration capacitor and its cathode coupled to said DC reference voltage providing means; and a timing circuit having an input for receiving the output of said pulse width modulation circuit and a first output coupled to said control terminal of said primary switch and a second output coupled to said control terminal of said regeneration switch, wherein said timing circuits turns off said regeneration switch in response to said pulse width modulation circuit asserting its output to initiate a power cycle and subsequently turns on said primary switch after a first delay from when said pulse width modulation circuit asserts its output, and turns off said primary switch in response to said pulse width modulation circuit negating its output initiating a flyback phase of a power cycle, and subsequently turns on said regeneration switch after a second delay from when said pulse width modulation circuit negates its output, wherein said timing circuit comprises:

a first diode having its anode coupled to said control terminal of said primary switch and its cathode coupled to said output of said pulse width modulation circuit;

a first resistor electrically coupled in parallel with said first diode;

a second diode having its anode coupled to said output of said pulse width modulation circuit and its cathode coupled to said control terminal of said regeneration switch;

a second resistor electrically coupled in parallel with said second diode; and a capacitor having a first terminal coupled to ground and a second terminal coupled to said control terminal of said regeneration switch.

17. A flyback converter, comprising:

means for providing a DC source voltage;

means for providing a DC reference voltage of ground;

a transformer having a primary inductor and a secondary inductor, Wherein said primary inductor has a first terminal and a second terminal, wherein said primary inductor second terminal is coupled to said DC source voltage providing means and receives said DC source voltage;

a primary switch having a control terminal and a current path between a first terminal and a second terminal, wherein said first terminal is coupled to said second terminal of said primary inductor and said second terminal of said primary switch is coupled to ground, said primary switch including a diode wherein said primary switch diode has its anode connected to said second terminal of said primary switch and its cathode connected to said first terminal of said primary switch;

a pulse width modulation circuit having an output for controlling consecutive power cycles of the flyback converter;

an output circuit coupled to said secondary inductor of said transformer to implement flyback operation; and a complementary regeneration circuit, comprising:

a regeneration capacitor having a first terminal and a second terminal, wherein said first terminal and a second terminal, wherein said first terminal of said regeneration capacitor is coupled to said first terminal of said primary switch;

a regeneration switch having a control terminal and two terminals having a current path between them, wherein a first terminal is connected to said regeneration capacitor and a second terminal is connected to said DC reference voltage providing means;

a regeneration diode electrically coupled in parallel with said current path of said regeneration switch and having its anode coupled to said second terminal of said regeneration capacitor and its cathode coupled to said DC reference voltage providing means;

a timing circuit having an input for receiving the output of said pulse width modulation circuit and a first output coupled to said control terminal of said primary switch and a second output coupled to said control terminal of said regeneration switch, wherein said timing circuits turns off said regeneration switch in response to said pulse width modulation circuit asserting its output to initiate a power cycle and subsequently turns on said primary switch after a first delay from when said pulse width modulation circuit asserts its output, and turns off said primary switch in response to said pulse width modulation circuit negating its output initiating a flyback phase of a power cycle, and subsequently turns on said regeneration switch after a second delay from when said pulse width modulation circuit negates its output; and a feedback circuit having an input coupled to said output circuit and an output providing a compensation signal to said pulse width modulation circuit.

18. The flyback converter of claim 17, further comprising:

a current sensor electrically coupled in series between said first and second terminals of said primary switch and ground providing a signal indicative of the current flowing through said primary inductor; and said pulse width modulation circuit including a sense input for receiving said signal indicative of the current flowing through said primary inductor, wherein said pulse width modulation circuit operates at a constant frequency asserting its output at the beginning of each period of said constant frequency to initiate each power cycle, and negating said output during each period to initiate a flyback phase for each power cycle when the current flowing through said primary inductor reaches a predetermined maximum value.

* * * * *

UNITED STATES PATENT AND TRADEMARK OFFICE
CERTIFICATE OF CORRECTION

PATENT NO.   :   5,455,757
DATED        :   Oct. 3, 1995
INVENTOR(S)  :   Hai N. Nguyen and James S. Dinh It is certified that error appears in the above-identified patent and that said Letters Patent is hereby corrected as shown below:

In col. 20, line 66, after "diode" insert --is--.

In col. 27, line 51, please replace "Wherein" with --wherein--.

Signed and Sealed this

Sixteenth Day of January, 1996

Attest:

BRUCE LEHMAN

Attesting Officer            Commissioner of Patents and Trademarks